United States Patent
Harshman et al.

(10) Patent No.: US 11,041,286 B2
(45) Date of Patent: Jun. 22, 2021

(54) RETENTION ASSEMBLY FOR GRADER MACHINE BLADE

(71) Applicant: Caterpillar Inc., Peoria, IL (US)

(72) Inventors: Nathaniel Keith Harshman, Sullivan, IL (US); James David Costner, III, Decatur, IL (US); David L Cox, Monticello, IL (US); Benjamin J Kovalick, Decatur, IL (US); Tanner Cade Koehne, Roodhouse, IL (US)

(73) Assignee: Caterpillar Inc., Peoria, IL (US)

( * ) Notice: Subject to any disclaimer, the term of this patent is extended or adjusted under 35 U.S.C. 154(b) by 681 days.

(21) Appl. No.: 15/839,138

(22) Filed: Dec. 12, 2017

(65) Prior Publication Data

US 2019/0177949 A1 Jun. 13, 2019

(51) Int. Cl.
  *E02F 3/815* (2006.01)
  *A01B 15/02* (2006.01)
  *E02F 3/84* (2006.01)
  *A01B 59/06* (2006.01)

(52) U.S. Cl.
  CPC ............ *E02F 3/8157* (2013.01); *A01B 15/02* (2013.01); *E02F 3/844* (2013.01); *A01B 59/064* (2013.01)

(58) Field of Classification Search
  CPC ....... E02F 3/8157; E02F 3/8152; E02F 3/844; A01B 15/02
  See application file for complete search history.

(56) References Cited

U.S. PATENT DOCUMENTS

| | | | | |
|---|---|---|---|---|
| 2,799,099 A | * | 7/1957 | Leliter | E02F 3/764 172/667 |
| 3,463,243 A | * | 8/1969 | Fisher | E02F 3/8157 172/781 |
| 3,465,829 A | | 9/1969 | Fisher et al. | |
| 4,058,174 A | * | 11/1977 | Atherton et al. | E02F 3/3618 172/781 |
| 4,084,643 A | * | 4/1978 | Easterling | E02F 3/7645 172/743 |
| 4,105,078 A | * | 8/1978 | Gilbert | E02F 3/815 172/741 |
| 5,076,370 A | * | 12/1991 | Stubben et al. | A01B 15/02 172/684.5 |
| 5,687,800 A | | 11/1997 | Wilkening | |
| 6,904,978 B2 | | 6/2005 | McGugan | |
| 8,316,956 B2 | | 11/2012 | Horstman et al. | |
| 2017/0130422 A1 | | 5/2017 | Zimmerman et al. | |

* cited by examiner

*Primary Examiner* — Thomas B Will
*Assistant Examiner* — Joel F. Mitchell (57) ABSTRACT

A retention assembly, to slidably retain a blade to a support bracket of a grader machine, includes a yoke, a bearing arrangement, and one or more pins. The yoke is adapted to be coupled to the support bracket, and includes a first sidewall, a second sidewall, and a cavity defined therebetween. The first sidewall defines a first thickness and one or more first bores. The second sidewall defines a second thickness and one or more second bores. The second bores are correspondingly co-axial to the first bores. The bearing arrangement is received within the cavity and is adapted to support the blade for a sliding movement of the blade relative to the bearing arrangement. Further, the pins extend correspondingly through at least one of the first bores or the second bores, and into the cavity to engage and retain the bearing arrangement within the cavity.

20 Claims, 9 Drawing Sheets

RETENTION ASSEMBLY FOR GRADER MACHINE BLADE

TECHNICAL FIELD

The present disclosure relates to a grader machine. More particularly, the present disclosure relates to a retention assembly to slidably retain a grader blade of the grader machine.

BACKGROUND

Grader machines, often referred to as motor graders, are typically used to displace, distribute, mix, and grade a material, such as soil, over a work surface. Grader machines commonly apply a grader blade to carry out one or more of these functions. Some machines may provide for lateral movement of the blade, thereby allowing the blade to assume various work-related positions relative to the work surface.

Commonly, bearing arrangements are employed for grader blades to slide against. As bearing arrangements may wear out, bearing arrangements may be adjusted relative to said grader blades to reduce or eliminate play. In several cases, adjustments need to be performed from a variety of angles, making an adjustment process laborious and time consuming. Further, conventional systems make visual inspection of a state of the bearing arrangements in situ a challenge.

U.S. Pat. No. 3,465,829 ('829 reference) relates to a mounting apparatus for disposing a grader blade upon a blade circle. The mounting apparatus includes a generally rectangular upper and lower side shifting rails angularly disposed at each side of a rearward surface of the grader blade. Each side shifting rail includes two oppositely inclined surfaces. A V-shaped slide bearing acts against the oppositely inclined surfaces of each side shifting rail. This system in the '829 reference is difficult to inspect and maintain.

SUMMARY OF THE INVENTION

In one aspect, the disclosure is directed towards a retention assembly to slidably retain a blade to a support bracket of a grader machine. The retention assembly includes a yoke, a bearing arrangement, and one or more pins. The yoke is adapted to be coupled to the support bracket, and includes a first sidewall, a second sidewall, and a cavity defined therebetween. The first sidewall defines a first thickness and one or more first bores extending through the first thickness. The second sidewall defines a second thickness and one or more second bores that at least partly extend through the second thickness. The second bores are correspondingly co-axial to the first bores. The bearing arrangement is received within the cavity and is adapted to support the blade for a sliding movement of the blade relative to the bearing arrangement. Further, the pins extend correspondingly through at least one of the first bores or the second bores, and into the cavity to engage and retain the bearing arrangement within the cavity.

In another aspect, the disclosure relates to a blade assembly for a grader machine. The blade assembly includes a blade, a support bracket, a yoke, a bearing arrangement, and one or more pins. The blade is adapted to engage a work surface. The support bracket is adapted to be coupled to a pair of arms extending from a circle member of the grader machine. The yoke is coupled to the support bracket, and is slidably engaged with the blade. The yoke includes a first sidewall defining a first thickness, and one or more first bores extending through the first thickness. Further, the yoke includes a second sidewall spaced apart from the first sidewall to define a cavity therebetween. The second sidewall defines a second thickness and includes one or more second bores at least partly extending through the second thickness. The second bores are correspondingly co-axial with the first bores. Further, the bearing arrangement is received within the cavity and is adapted to support the blade for sliding movement of the blade relative to the bearing arrangement. The pins extend correspondingly through at least one of the first bores or the second bores, and into the cavity to engage and retain the bearing arrangement within the cavity.

In yet another aspect, the disclosure is directed to a grader machine. The grader machine includes a circle member, a pair of arms extending from the circle member, a support bracket, a moldboard, a yoke, a bearing arrangement, and one or more pins. The support bracket is movably coupled to the pair of arms extending from the circle member. The moldboard is adapted to engage a work surface. The yoke is coupled to the support bracket, and is slidably engaged with the moldboard. The yoke includes a first sidewall that defines a first thickness, and one or more first bores extending through the first thickness. Further, the yoke includes a second sidewall spaced apart from the first sidewall to define a cavity therebetween. The second sidewall defines a second thickness and includes one or more second bores at least partly extending through the second thickness. The second bores are correspondingly co-axial with the first bores. The bearing arrangement is received within the cavity and is adapted to support the moldboard for sliding movement of the moldboard relative to the bearing arrangement. Moreover, the pins extend correspondingly through at least one of the first bores or the second bores, and into the cavity to engage and retain the bearing arrangement within the cavity.

DETAILED DESCRIPTION

Figure 1:
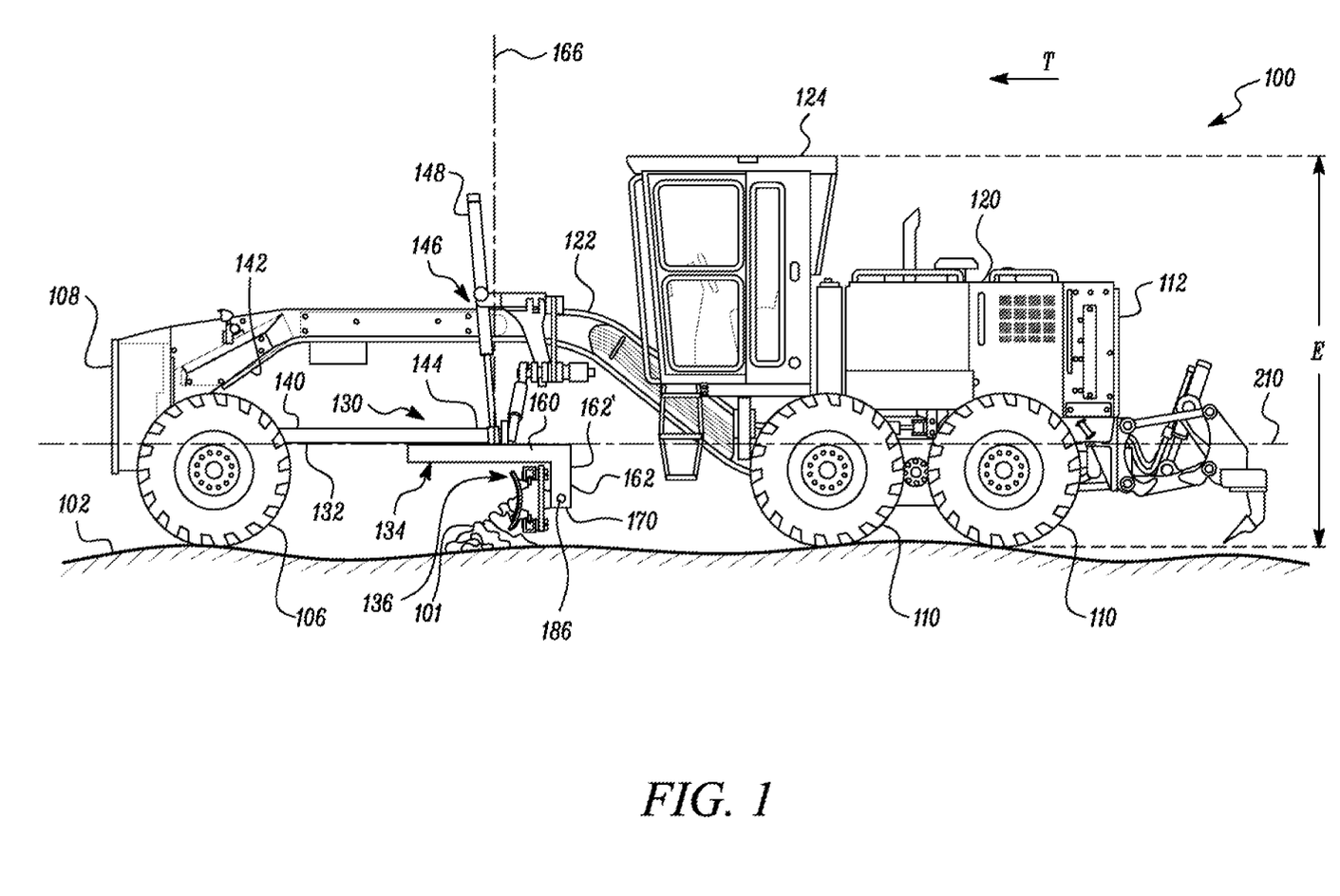
FIG. 1 is a grader machine including an exemplary blade assembly.

Referring to FIG. 1, a grader machine 100 is shown, and as depicted, is a motor grader. The grader machine 100 may be used to displace, spread, distribute, level, and grade materials 101, such as soil, over a work surface 102. Generally, a grading operation is performed during machine movement, and for this purpose, the grader machine 100 may include traction devices that facilitate movement over the work surface 102. For example, traction devices include a set of front wheels 106 disposed towards a front end 108 of the grader machine 100 and a set of rear wheels 110 disposed towards a rear end 112 of the grader machine 100. The terms 'front' and 'rear', as used herein, are in relation to a direction of travel of the grader machine 100, as represented by arrow, T, in FIG. 1, with said direction of travel being exemplarily defined from the rear end 112 towards the front end 108. A movement of the traction devices (i.e. a rotation of the set of front wheels 106 and set of rear wheels 110) may be powered by power source, such as an engine (not shown), housed in a power compartment 120 of the grader machine 100. Further, the grader machine 100 may include a frame 122, and an operator cab 124 that houses controls of the power source and various implements of the grader machine 100, supported on the frame 122.

To grade and level materials 101, the grader machine 100 may include a drawbar-circle-blade (DCB) arrangement 130—also referred to as a grader group 130. The grader group 130 may be supported by the frame 122. The grader group 130 may include a drawbar 132, a circle assembly 134, and a blade assembly 136, each of which may function in concert to perform a grading operation on the work surface 102.

The drawbar 132 may include a first end 140 pivotally coupled to a front end 142 of the frame 122 and a second end 144 movably supported by another portion (such as a mid-portion 146) of the frame 122. For example, the second end 144 of the drawbar 132 may be coupled to the mid-portion 146 of the frame 122 via one or more actuators, such as a hydraulic actuator 148. The hydraulic actuator 148 may be actuated to raise or lower the second end 144 of the drawbar 132 with respect to the frame 122, in turn allowing the grader group 130 to be raised or lowered relative to the work surface 102.

The circle assembly 134 includes a circle member 160 and a pair of arms 162. The circle member 160 rotates relative to the drawbar 132 about a rotation axis 166 that passes through a center of the circle member 160. Further, the pair of arms 162 may extend from the circle member 160 and may rotate with a rotation of the circle member 160, relative to the drawbar 132. It may be noted that only one arm 162' is shown since the other of the pair of arms 162 is hidden behind arm 162' in the orientation of the grader group 130 provided in FIG. 1. Each of the pair of arms 162 may be diametrically opposed and spaced apart from the other, and extends from an outer surface of the circle member 160 in an axial direction (such as along the rotation axis 166) to define a lower end (see end 170 of arm 162' annotated in FIG. 1) away from the circle member 160.

Figure 2:
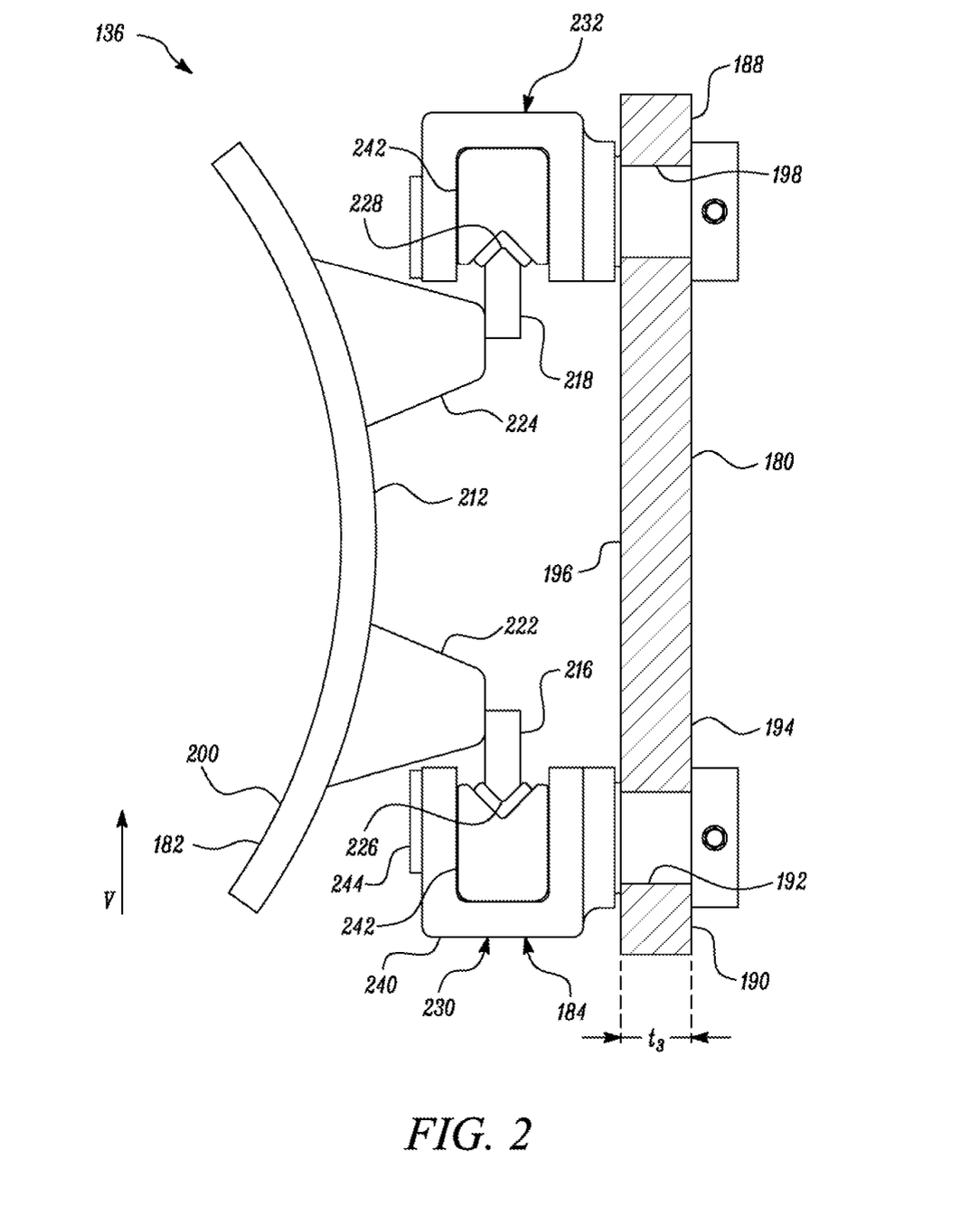
FIG. 2 is an enlarged, side view in partial cross-section of the blade assembly of FIG. 1.

Referring to FIGS. 1 and 2, the blade assembly 136 is discussed. The blade assembly 136 is supported by the pair of arms 162, and includes a support bracket 180, a blade 182, and a retention assembly 184. The retention assembly 184 is adapted to slidably support the blade 182 with respect to the support bracket 180.

The support bracket 180 may be a single continuous piece coupled to the pair of arms 162. The support bracket 180 may be movably (i.e. pivotably) coupled to the ends of the pair of arms 162 (such as to end 170 of arm 162'), and may pivot relative to the pair of arms 162 about a pivot axis 186 (see FIG. 1).

The support bracket 180 may include an upper end 188 and a lower end 190, defined relative to an elevation, E (see FIG. 1), of the grader machine 100. The support bracket 180 includes an opening 192, formed at the lower end 190, as shown. The opening 192 extends from a first side surface 194 of the support bracket 180 to an opposed, second side surface 196 of the support bracket 180. The support bracket 180 also includes an opening 198, similar to opening 192, formed at the upper end 188, as well. For ease, the opening 192 at the lower end 190 may be referred to as the lower opening 192, while the opening 198 at the upper end 188 may be referred to as the upper opening 198.

Figure 6:
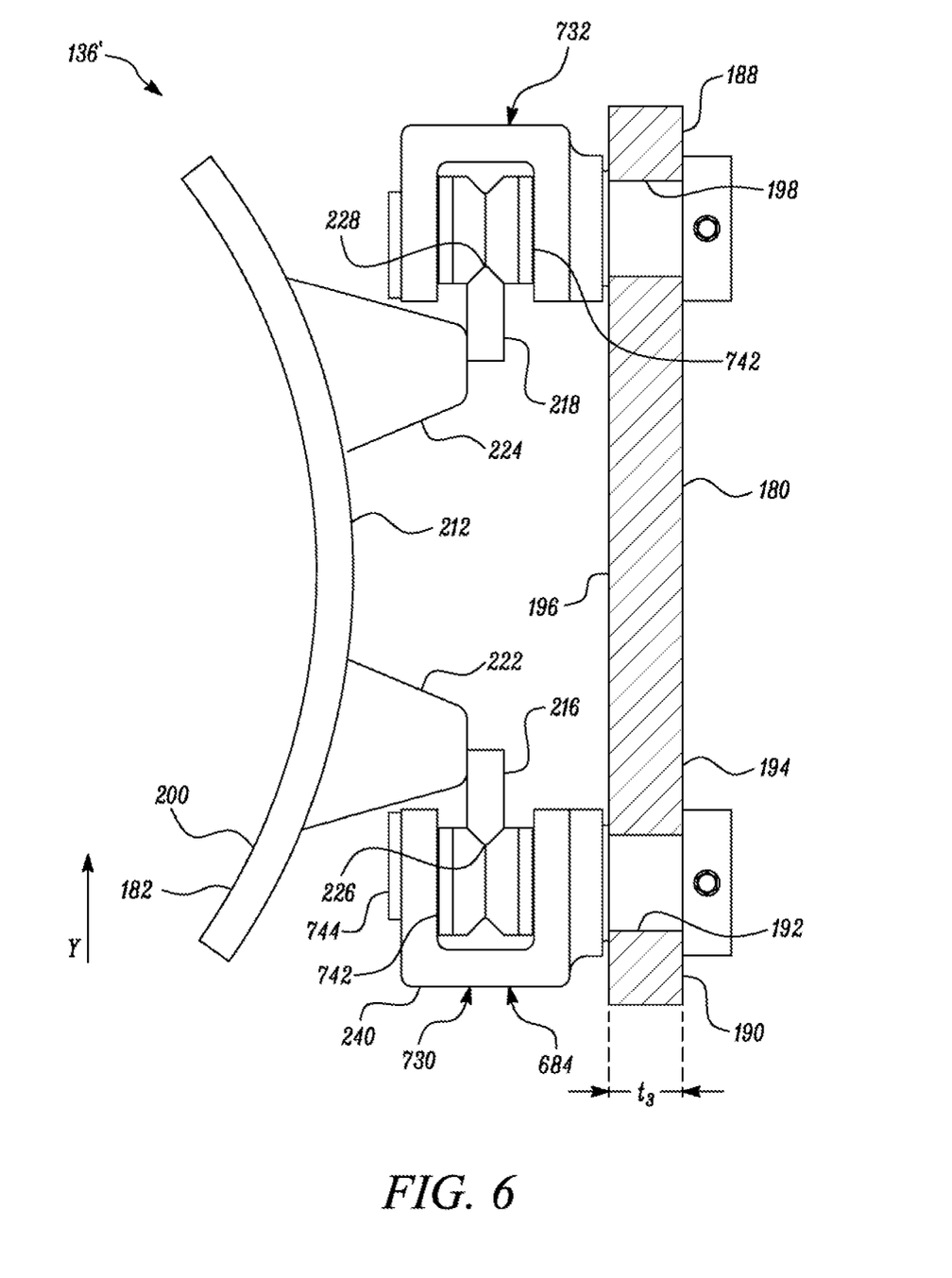
FIG. 6 is an enlarged, side view in partial cross-section of another exemplary blade assembly.

The blade 182 (which is also sometimes referred to as a moldboard) is a ground engaging tool adapted to engage the material over the work surface 102, and grade and level the work surface 102 (see FIG. 1). The blade 182 may be contoured to have a concave shape, as shown in FIGS. 1, 2, and 6. A front face 200 of the blade 182 is directed towards the front end 108 of the grader machine 100, so that the blade 182 may receive, alter, and grade the material, during a travel of the grader machine 100 along direction, T. The blade 182 may include a variety of other shapes, such as a planar shape.

The blade 182 may be moved to a host of work related positions relative to the work surface 102. For example, the blade 182 may be raised or lowered relative to the work surface 102 by raising and lowering the second end 144 of the drawbar 132 relative to the frame 122 by use of the hydraulic actuator 148. Further, the blade 182 may be rotated about the rotation axis 166 as the circle member 160 may be rotated about the rotation axis 166 by the motor. The blade 182 may also be pivoted about the pivot axis 186 according to the pivotal movement executed by the support bracket 180 relative to the pair of arms 162 so as to change the angle at which the blade 182 intersects the work surface 102. A variety of other orientations of the blade 182, including a tilting of the blade 182, such as about a longitudinal axis 210 of the grader machine 100 (see FIG. 1) is also possible.

The blade 182 is adapted to slide in a lateral direction relative to the longitudinal axis 210 of the grader machine 100. Such slidable motion of the blade 182 may be achieved by hydraulic actuation or by a rack and pinion mechanism, for example. The blade 182 may define a blade length, and may be adapted to slide back-and-forth relative to the support bracket 180 along a direction defined by the blade length. The blade 182 includes a rear face 212, opposed to the front face 200, and rails (i.e. a first rail 216 and a second rail 218) extending from the rear face 212. As shown, the rails 216, 218 extend along the blade length. As illustrated in FIGS. 1 and 2, the blade 182 may include a first support structure 222 and a second support structure 224 extending outwardly from the rear face 212 of the blade 182. The first rail 216 and the second rail 218 are respectively coupled to the first support structure 222 and the second support structure 224, and may be directed away from each other in a vertically oriented direction, as shown in FIG. 2. The first rail 216 and the second rail 218 may include a centrally protruded end 226, 228 that may impart a V-shaped profile to both the first rail 216 and the second rail 218, as illustrated, with the points of the V-shaped profile pointing away from each other.

With continued reference to FIG. 2, the retention assembly 184 is adapted to slidably support the blade 182 with respect to the support bracket 180. The retention assembly 184 may include a number of retainer units. For example, and as shown, the retention assembly 184 includes a lower retainer unit 230 and an upper retainer unit 232, as illustrated. The lower retainer unit 230 is coupled to the lower opening 192 formed at the lower end 190 of the support bracket 180, and is slidably engaged with the first rail 216 of the blade 182. The upper retainer unit 232 is coupled to the upper opening 198 formed at the upper end 188 of the support bracket 180, and is slidably engaged with the second rail 218 of the blade 182.

Additional retainer units may be provided, in some cases. For example, a third retainer unit (not shown) and a fourth retainer unit (not shown) may be coupled to the support bracket 180 in a manner similar to what has been disclosed respectively of the lower retainer unit 230 and the upper retainer unit 232, and may be hidden behind the lower retainer unit 230 and the upper retainer unit 232 in the view provided in FIG. 2.

For ease of reference and understanding, a structure of only the lower retainer unit 230 is discussed. A structure of the upper retainer unit 232 is similar to that of the lower retainer unit 230. Further, a coupling of the lower retainer unit 230 to the lower opening 192, as discussed below, is applicable to a coupling of the upper retainer unit 232 with the upper opening 198, as well. The lower retainer unit 230 of the retention assembly 184 includes a yoke 240, a bearing arrangement 242, and one or more pins 244.

Figure 3:
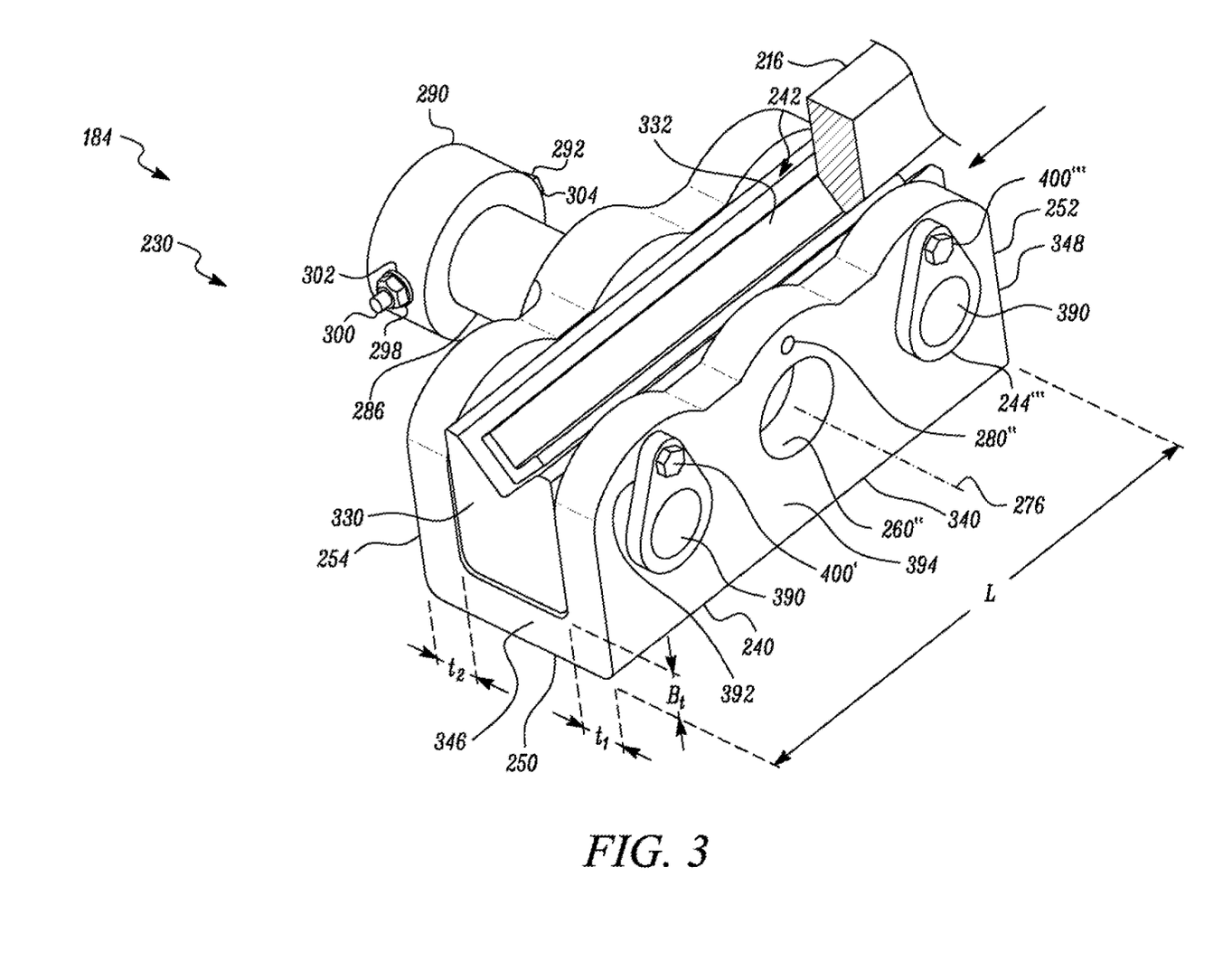
FIG. 3 is an assembled view of a bearing arrangement of the blade assembly of FIGS. 1 and 2.
Figure 4:
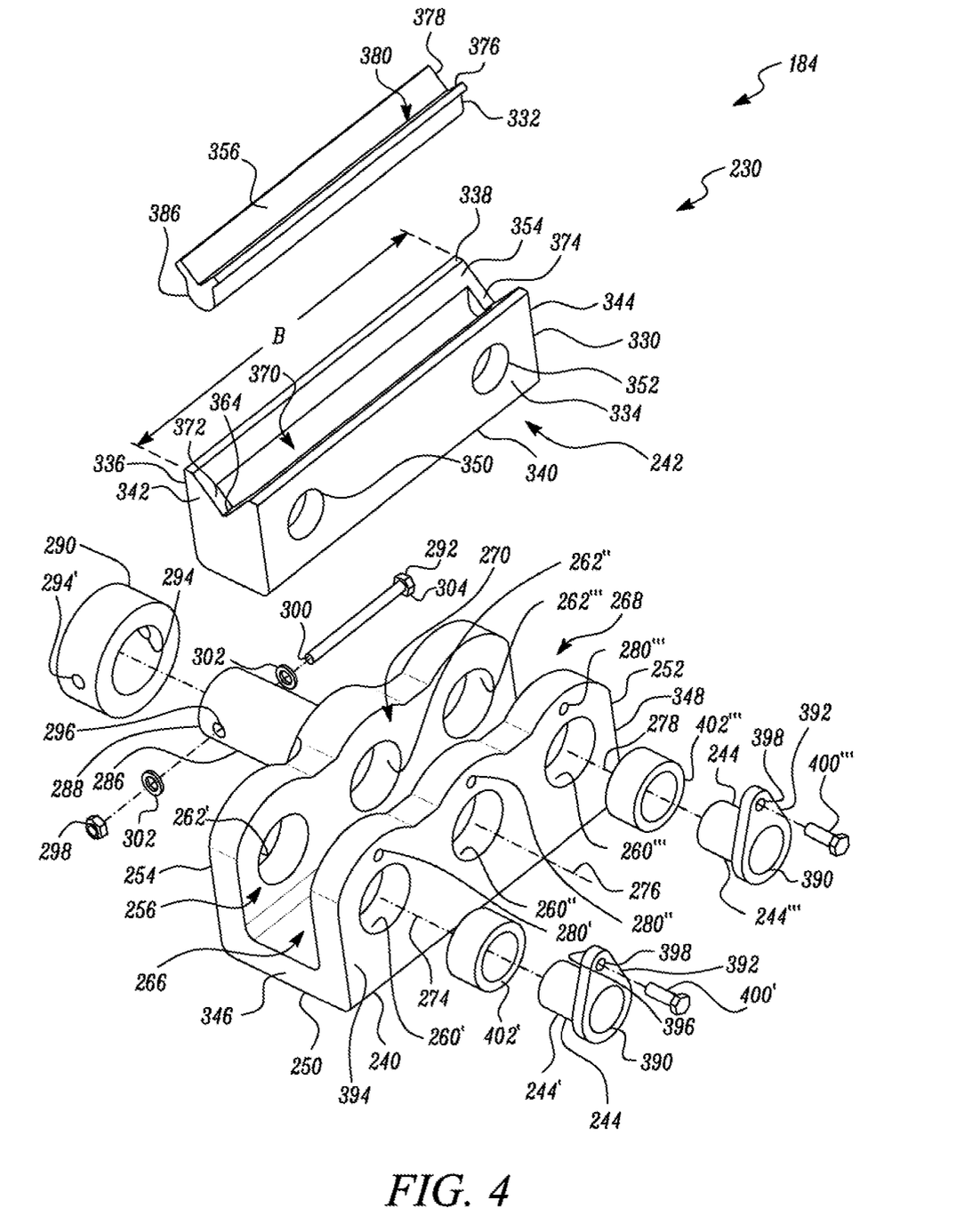
FIG. 4 is an exploded view of the bearing arrangement of FIG. 3.
Figure 5:
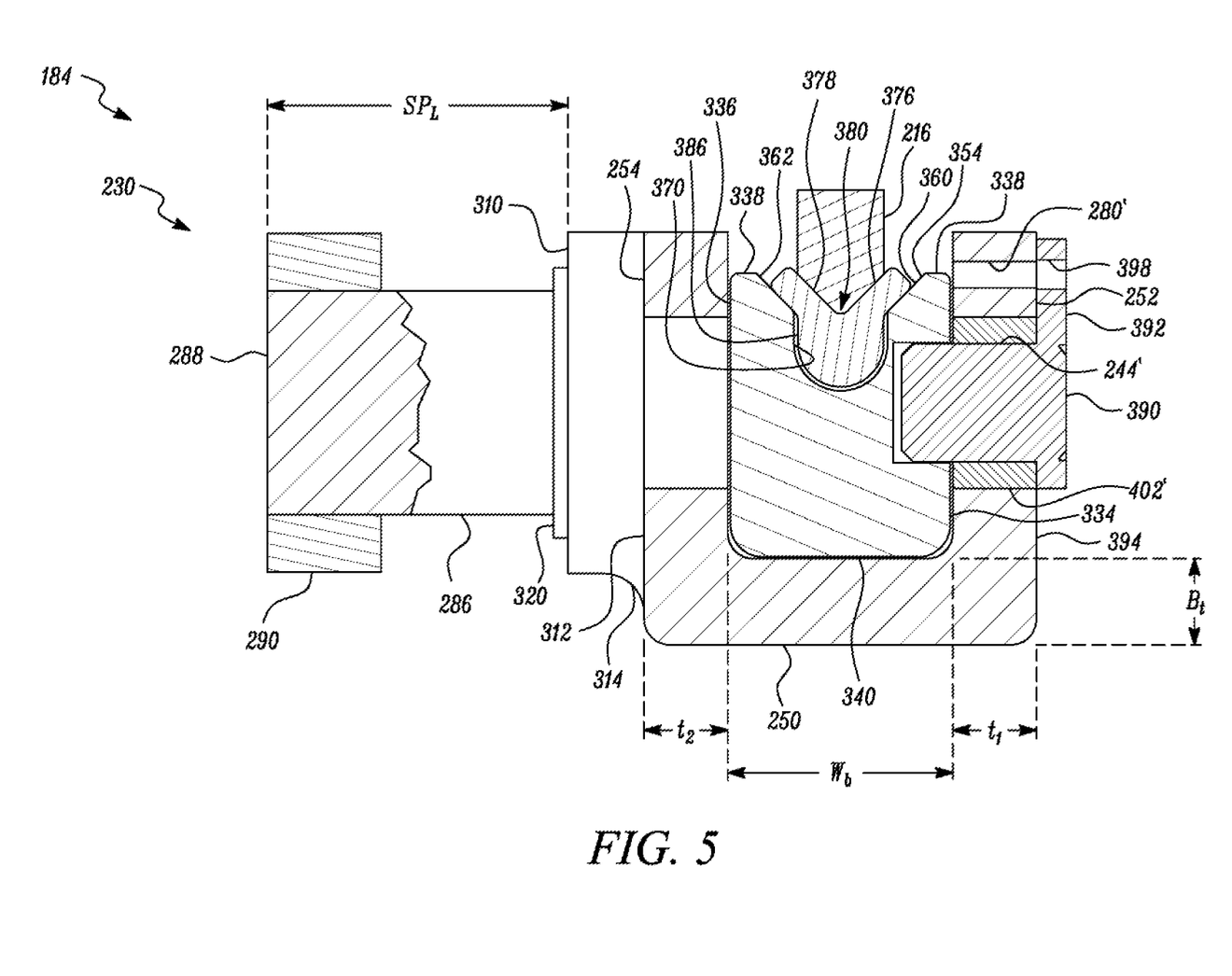
FIG. 5 is a side cross-sectional view of the bearing arrangement of FIG. 3.

Referring to FIGS. 3, 4, and 5, the yoke 240 has a generally U-shaped profile, defining a base 250, a first sidewall 252, and a second sidewall 254. The first sidewall 252 and the second sidewall 254 may be upright relative to the base 250, as shown, and may be parallel to each other. The second sidewall 254 may be spaced apart from the first sidewall 252 to define a cavity 256 (FIG. 4) in the space bounded by the base 250 and the sidewalls 252, 254. The first sidewall 252 faces the blade 182, while the second sidewall 254 faces away from the blade 182. The first sidewall 252 has a first thickness $t_1$, and one or more first bores that extend through the first sidewall 252. For example, three first bores 260', 260", 260'" are shown, and each of which extends entirely through the first thickness $t_1$. Similarly, the second sidewall 254 has a second thickness $t_2$, with one or more second bores that at least partly extend through the second sidewall 254. For example, three second bores 262', 262", 262'" are shown. Second bores 262' and 262'" may extend entirely through the second thickness $t_2$, but the second bore 262" may be a blind bore, and may extend only partly through the second thickness $t_2$, and may be accessible from within the cavity 256. A higher or a lower number of first bores 260', 260", 260'" and second bores 262', 262", 262'" are possible. Further, in some implementations, the first thickness $t_1$ may be equal to the second thickness $t_2$. In one example, the base 250 may define a thickness $B_t$ equal to either of the first thickness $t_1$ or the second thickness $t_2$, and may be contiguously merged with the first sidewall 252 and the second sidewall 254. For example, the first sidewall 252, the second sidewall 254, and the base 250, may integrally formed by casting a material, such as a metallic material, in a single mold to define a unitarily formed U-shaped structure of the yoke 240. The yoke 240 may be open from three sides (for example, a first lateral side 266, a second lateral side 268, and a top side 270), providing access to the cavity 256 defined between the first sidewall 252 and the second sidewall 254. In an embodiment a length of the first sidewall 252, the second sidewall 254, and the base 250, may be equal, and may in turn define a length, L, of the yoke 240.

In an embodiment, the first bores 260', 260", 260'" are correspondingly co-axial with the second bores 262', 262", 262'". For example, a first axis 274 may be defined as a common axis between the first bore 260' and the second bore 262', a second axis 276 may be defined as a common axis between the first bore 260" and the second bore 262", and a third axis 278 may be defined as a common axis between the first bore 260'" and the second bore 262'". The axes 274, 276, 278 may be perpendicular to the first sidewall 252 and the second sidewall 254. Further, the first sidewall 252 may also define a corresponding pin aperture associated with each of the first bores 260', 260", 260'". For example, a first aperture 280' may be spaced apart from the first bore 260', a second aperture 280" may be spaced apart from the first bore 260", a third aperture 280" may be spaced apart from the first bore 260'". As shown, the apertures 280', 280", 280'" are all positioned above their corresponding first bores 260', 260", 260'".

The yoke 240 includes a shaft portion 286 that extends outwardly from the second sidewall 254. For example, the shaft portion 286 may extend perpendicularly relative to the second sidewall 254, and may be centered relative to the length. L, of the yoke 240. The shaft portion 286 may be cylindrical in shape, and may define an end 288 remote to the second sidewall 254.

The shaft portion 286 may be coupled to the support bracket 180 by having the end 288 passed through the lower opening 192 of the support bracket 180 from the first side surface 194, moved through a thickness, $t_3$, of the support bracket 180, and revealed from the second side surface 196 of the support bracket 180. The retention assembly 184 may also include a collar 290 that is coupled to the end 288 of the shaft portion 286, revealed from the second side surface 196, to couple and secure the yoke 240 to the support bracket 180.

In one example, a retainer pin 292 may pass through diametrically opposed holes 294, 294' formed in the collar 290, engaging the end 288 of the shaft portion 286 by passing through a hole 296 formed at the end 288, in turn retaining the collar 290 to the end 288. The retainer pin 292 may be held in place, in such configuration, by a securing a nut 298 to an end 300 of the retainer pin 292, as shown in FIGS. 3 and 4. Further, a set of washers 302 may be each respectively interposed between the nut 298 and collar 290, and a head 304 of the retainer pin 292 and the collar 290, as shown.

The yoke 240 may include additional material formed at a junction between the second sidewall 254 and the shaft portion 286. For example, this additional material may be in the form of a stepped flange 310 that is circularly defined around a perimeter of the shaft portion 286, and may include a diameter larger than a diameter of the shaft portion 286 (as shown in FIG. 5). The stepped flange 310 may merge into an outer surface 312 of the second sidewall 254. For example, the stepped flange 310 and the outer surface 312 of the second sidewall 254 may meet at a filleted edge 314. In an embodiment, the second thickness, $t_2$, of the second sidewall 254 is one fifth of the length, $SP_L$, (see FIG. 5) of the shaft portion 286 between the end 288 and the stepped flange 310.

Further, one or more thrust washers (see thrust washer 320) may be interposed between the stepped flange 310 and the first side surface 194 of the support bracket 180. Similarly, one or more thrust washers (not shown) may be interposed between the second side surface 196 of the support bracket 180 and the collar 290, as well. Additional thrust washers may be used in this respect to take up any tolerance either between the collar 290 and the second side surface 196 or between the stepped flange 310 and the first side surface 194.

With continued reference to FIGS. 3, 4, and 5, the bearing arrangement 242 will now be discussed. The bearing arrangement 242 is received within the cavity 256, and is adapted to support the first rail 216 of the blade 182 for sliding movement of the blade 182 relative to the bearing arrangement 242. The bearing arrangement 242 includes a block 330 and a wear strip 332.

The block 330 includes a shape that complies with a shape of the cavity 256 so as to be received within the cavity 256. The block 330 is generally cuboid shaped, including a first side 334, a second side 336, a top 338, and a bottom 340. Further, the block 330 also defines a first end 342 and a second end 344 that are each laterally defined with respect to each of the first side 334, the second side 336, the top 338, and the bottom 340. A length, B, of the block 330 extends from the first end 342 to the second end 344. In an assembly of the block 330 within the cavity 256, the first side 334 may abut against the first sidewall 252, the second side 336 may abut against the second sidewall 254, and the bottom 340 may abut against the base 250 of the yoke 240. Moreover, a length, B, of the block 330 may be equal to a length, L, of the yoke 240. In that way, the first end 342 and the second end 344 of the block 330 may sit flush to an end 346 of the yoke 240 defined at the first lateral side 266 and to an end 348 of the yoke 240 defined at the second lateral side 240.

Furthermore, and as shown in FIG. 4, the first side 334 of the block 330 defines one or more recesses. In the depicted embodiment, there are two recesses, namely a first recess 350 and a second recess 352. In an assembly of the block 330 within the cavity 256, the first recess 350 may be co-axial to the first bore 260', while the second recess 352 may be co-axial to the first bore 260'''. Alternatively, it is possible that the first side 334 includes a single recess alone that is co-axial with the first bore 260''. Additionally, or optionally, the second side 336 of the block 330 may also include similar one or more recesses (not shown) which are co-axial to one or more of the second bores 262', 262'', 262''' of the second sidewall 254. The first recess 350 and the second recess 352 may be blind bores, as shown in FIG. 4, or the first recess 350 and the second recess 352 may extend through the entire width $W_b$ (FIG. 5) of the block 330.

The top 338, in assembly of the block 330 within the cavity 256, may be exposed from the top side 270 of the cavity 256, and may include an indentation 354 defined along and throughout the length, B, of the block 330. The indentation 354 is defined by a first inclined wall 360 and a second inclined wall 362, both of which start from the top 338, extend inwardly relative to the block 330, and meet at a line of intersection 364 that travels the length, B, of the block 330. Such a configuration imparts a V-shaped profile to the indentation 354, and thus to the block 330, from either the first end 342 or the second end 344 of the block 330 (see FIG. 5).

The block 330 also defines a receptacle 370 that is defined along the length, B, of the block 330 and is recessed into the block 330 from the first inclined wall 360 and the second inclined wall 362. In one example, the receptacle 370 is shorter in length than the length, B, of the block 330, and may terminate well before the first end 342 and the second end 344, thereby defining wall margins, such as first wall margin 372 and second wall margin 374, at either ends of the receptacle 370, relative to the first end 342 and the second end 344. The first wall margin 372 may be equal in width to the second wall margin 374. In the depicted embodiment, a profile of the receptacle 370 has a concave bowl shape (see FIG. 5), although it is possible for the receptacle 370 to take a rectangular shape, an elliptical shape, a circular, or any other shape.

The wear strip 332 defines a first wall portion 376 and a second wall portion 378. The first wall portion 376 and the second wall portion 378 are angled relative to each other, and meet at a common junction 380 to impart a V-shaped profile to at least a portion of the wear strip 332. The V-shaped configuration of the wear strip 332 may be configured to receive and accommodate the centrally protruded end 226 of the first rail 216 for a slidable engagement of the centrally protruded end 226 relative to the wear strip 332. The wear strip 332 further includes a protruded portion 386 that extends from below the V-shaped portion defined by the wall portions 376, 378, and which generally corresponds with the shape of the receptacle 370 defined within the block 330. In assembly, the protruded portion 386 is received within the receptacle 370, and the first wall portion 376 and the second wall portion 378 is seated respectively against the first inclined wall 360 and the second inclined wall 362 (see cross-sectional profile in FIG. 5). Moreover, lateral ends of the wear strip 332 may abut against the wall margins 372, 374 of the block 330, thereby restraining a movement of the wear strip 332 along the length, B, of the block 330. Effectively, the wear strip 332 may be engaged with the block 330. In assembly with the block 330, the wear strip 332 may be adapted to be interposed between the block 330 and the blade 182 to provide a surface 356 (see FIG. 4) for the blade 182 (or the first rail 216) to slide relative to the wear strip 332.

The pins may be one or more in number. For example, the views in FIGS. 3 and 4 depict usage of two pins, namely a first pin 244' and a third pin 244''' (a second pin may be omitted in this embodiment, but may be envisioned by viewing a second pin 744'' in the embodiments disclosed in FIGS. 7 to 9). The first pin 244' is inserted through the first bore 260' and received into the first recess 350 of the block 330 to secure the block 330 within the cavity 256. Similarly, the third pin 244''' is inserted through the first bore 260'''' and received into the second recess 352 of the block 330 to secure the block 330 within the cavity 256. As shown, an axis defined by the first pin 244' and the third pin 244''' may be aligned respectively to the first axis 274 and the third axis 278. Moreover, such engagement restrains the block 330 from moving out of the cavity 256, or out from any of the three sides 266, 268, 270 of the cavity 256 from where the cavity 256 remains open for access. Optionally, the first side 334 may include a single recess that is co-axial with the first bore 260'', and a second pin (not shown) may be inserted into the first bore 260'' and extended into the single recess (not shown), so that the second pin (not shown) may be solely used to engage and retain the block 330 within the cavity 256.

As shown in FIGS. 3, 4, and 5, the first pin 244' includes a head portion 390 and a lobe portion 392 that projects outwardly from the head portion 390. The lobe portion 392 may rest on an outer surface 394 of the first sidewall 252 in an assembly of the first pin 244' to the first sidewall 252. The lobe portion 392 may be fabricated to the head portion 390, but it is possible for the head portion 390 and the lobe portion 392 to be integrally formed. The lobe portion 392 defines an apex 396, and a first slot 398 formed at the apex 396. For assembling the first pin 244' through the first bore 260', and further into the first recess 350, the first slot 398 may be co-axially positioned relative to the first aperture 280'.

A fastener, such as a first fastener 400', may be inserted and passed through the first slot 398 and the first aperture 280' so as to secure the lobe portion 392, and thus the first pin 244' to the first sidewall 252. The insertion and fastening of the first pin 244' also restricts a rotation of the first pin 244' relative to the first axis 274. A structure of the third pin 244''', and an arrangement of the third pin 244''', by use of a third fastener 400''', relative to the first sidewall 252 may be similar to that of the first pin 244'. Accordingly, annotations corresponding only to the first pin 244' have been provided for clarity and ease in understanding.

In an embodiment, a bearing, annotated as a first bearing 402' may be interposed between the first pin 244' and the first bore 260'. Similarly, a third bearing 402''' may be interposed between the third pin 244''' and the first bore 260'''. The first bearing 402' and the third bearing 402''' may include bush bearings, roller bearing, or any other appropriate bearing structure.

Turning next to FIGS. 6, 7, 8, and 9, another retention assembly 684 for slidably supporting a blade of a blade assembly 136' is shown. The blade of the blade assembly 136' may be same as blade 182. The retention assembly 684 includes a lower retainer unit 730 and upper retainer unit 732, similar to the retainer units 230, 232. The lower retainer unit 730 and upper retainer unit 732 include a bearing arrangement 742 that differs from the bearing arrangement 242. Moreover, the retention assembly 684 includes pins 744 that differ from the pins 244.

The bearing arrangement 742 includes one or more roller bearings 750 instead of a wear strip and a block as disclosed in the embodiment of the FIGS. 2 to 5. More particularly, the roller bearings 750 include a first roller bearing 750', a second roller bearing 750", and third roller bearing 750''', that are positioned in sequence within the cavity 256. The first roller bearing 750' includes a first through hole 752' defining a first axis of rotation 754'; the second roller bearing 750" includes a second through hole 752" defining a second axis of rotation 754"; the third roller bearing 750''' includes a third through hole 752''' defining a third axis of rotation 754''' (see FIG. 8). In an assembly of the roller bearings 750 into the cavity 256, the first roller bearing 750' may be positioned so as to align the first axis of rotation 754' with the first axis 274; the second roller bearing 750" may be positioned so as to align the second axis of rotation 754" with the second axis 276; the third roller bearing 750''' may be positioned so as to align the third axis of rotation 754''' with the third axis 278.

Each of the roller bearings 750'. 750", 750''', may respectively include a first outer surface 756', a second outer surface 756", and a third outer surface 756''', configured to engage the blade 182 (such as the first rail 216 of the blade 182, see FIG. 6) for sliding movement of the blade 182 relative to the bearing arrangement 742. It may be noted that in the configuration shown in FIGS. 6 to 9, a slide of the blade 182 relative to the bearing arrangement 742 means that as the blade 182 may slide in a lateral direction relative to a longitudinal axis 210 of the grader machine 100, a contact between the first rail 216 and each of the first outer surface 756', second outer surface 756", and third outer surface 756''', respectively causes the first roller bearing 750', second roller bearing 750", and the third roller bearing 750''', to rotate and roll about the respective axes of rotation 754', 754", 754''' in response to the movement of the first rail 216. This is because of friction (i.e. rolling friction) that may exist between a surface of the first rail 216 and each of the first outer surface 756', second outer surface 756", and third outer surface 756'''. Each of the first outer surface 756', second outer surface 756", and the third outer surface 756''', may include protruded features that enhance a coefficient of friction of the roller bearings 750', 750", 750''' with the first rail 216, such as knurling.

Details of the first roller bearing 750' will now be discussed below, and these details may be equivalently applicable to the second roller bearing 750" and the third roller bearing 750'''. Certain annotations have provided on the first roller bearing 750' alone for clarity and ease.

Figure 8:
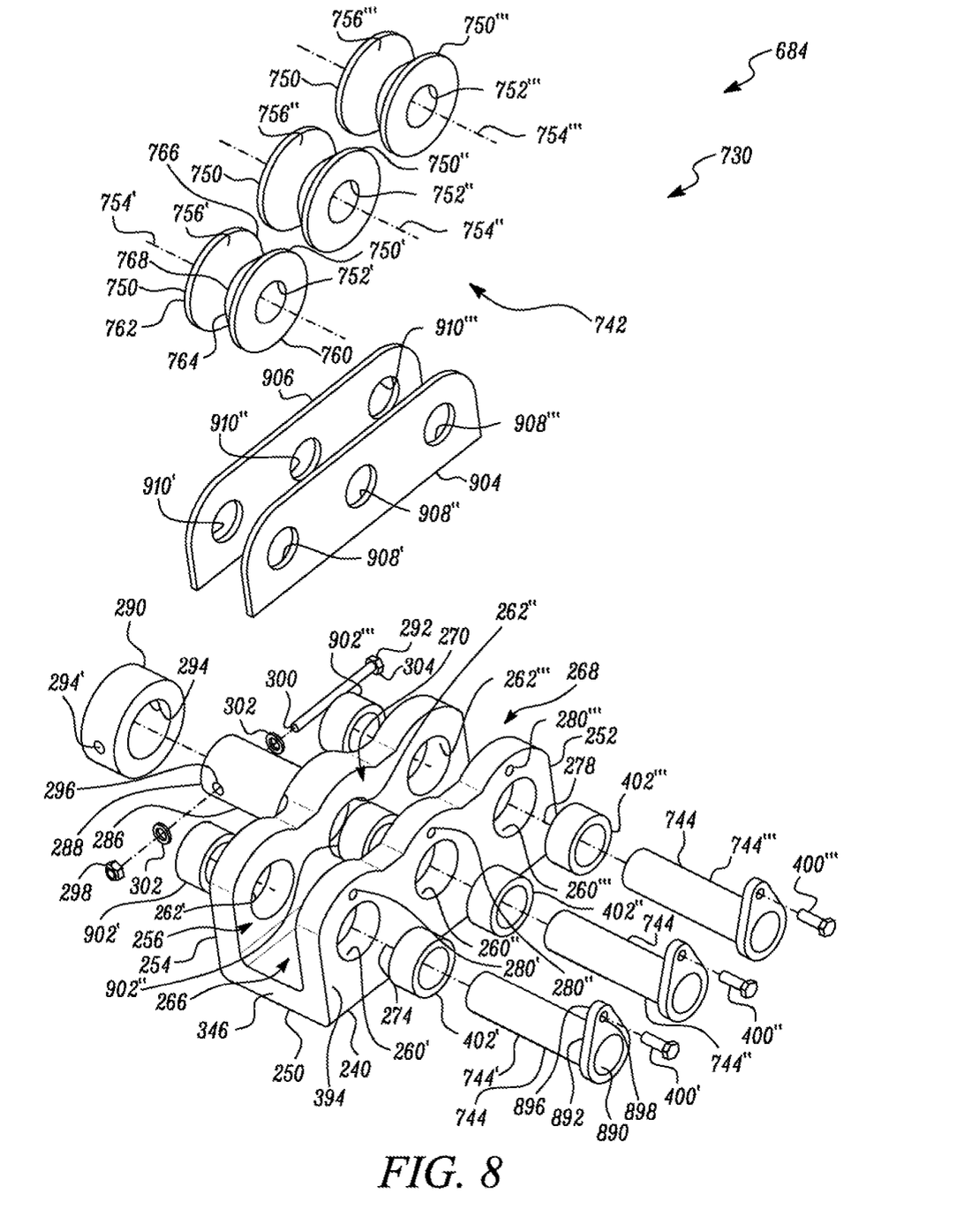
FIG. 8 is an exploded view of the bearing arrangement of FIG. 7.

The first roller bearing 750' extends between a first axial end 760 and a second axial end 762 (see FIG. 8). Further, the first roller bearing 750' includes a first frusto-conical portion 764 extending from the first axial end 760, and a second frusto-conical portion 766 extending from the second axial end 762. The first frusto-conical portion 764 and the second frusto-conical portion 766 converge towards each other and meet at a junction 768 of the first roller bearing 750'. This junction 768 is also referred to as a central roller portion 768 that separates the first frusto-conical portion 764 from the second frusto-conical portion 766. The central roller portion 768 is narrower in diameter than the first frusto-conical portion 764 and the second frusto-conical portion 766. A diameter of the first roller bearing 750' is smallest at the central roller portion 768 and is largest at the first axial end 760 and the second axial end 762. The diameter of the first roller bearing 750' at the first axial end 760 may be equal to a diameter of the first roller bearing 750' at the second axial end 762. The central roller portion 768 may be equally distanced from the first axial end 760 and the second axial end 762. Therefore, the first outer surface 756' may define a V-shaped profile of the first roller bearing 750' from a radial end of the first roller bearing 750'. The V-shaped profile of the first roller bearing 750' may be configured to receive and accommodate the centrally protruded end 226 (see FIG. 9) of the first rail 216, so that the first roller bearing 750' may roll as the centrally protruded end 226 may move relative to the first roller bearing 750'.

Figure 7:
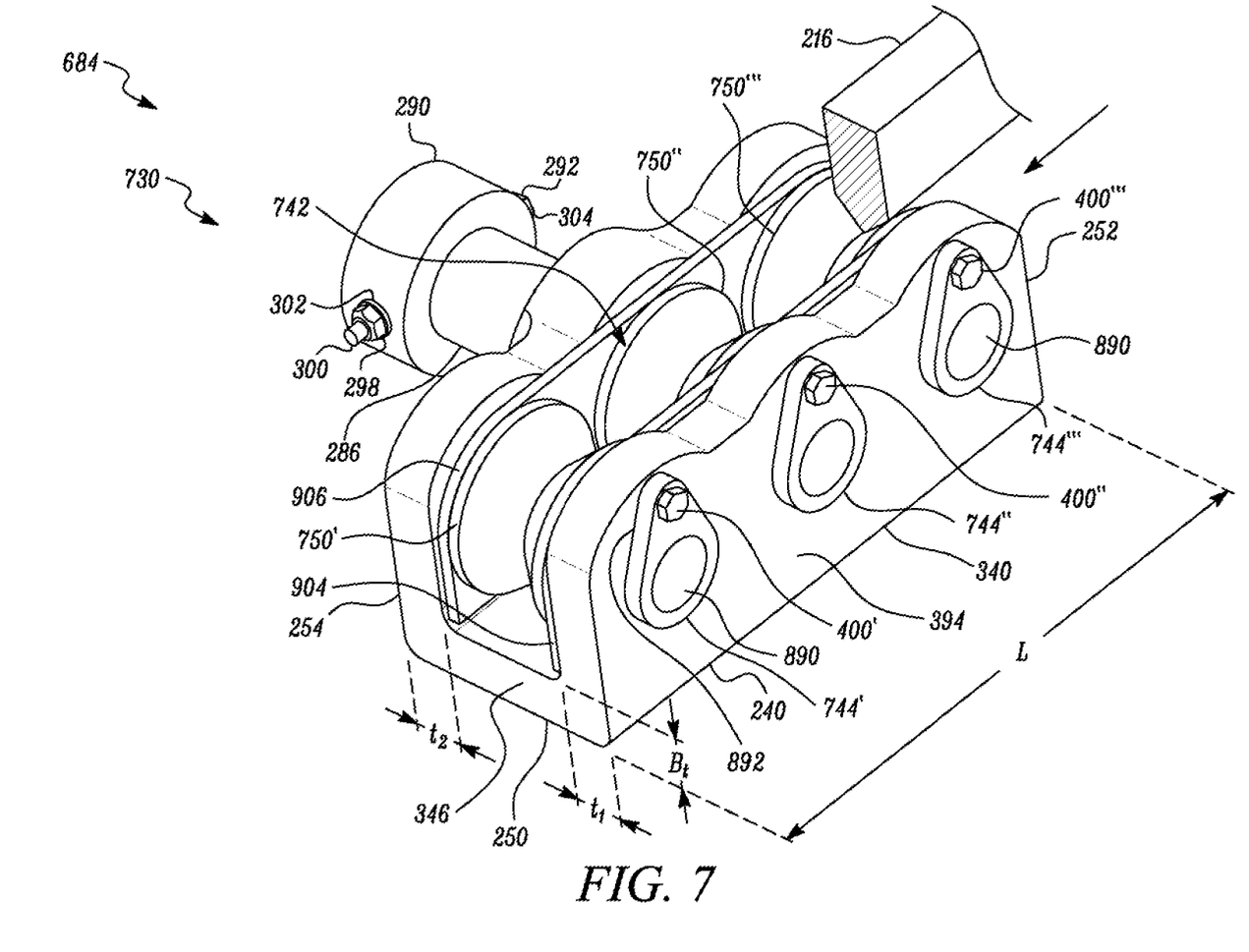
FIG. 7 is an assembled view of a bearing arrangement of the blade assembly of FIG. 6.
Figure 9:
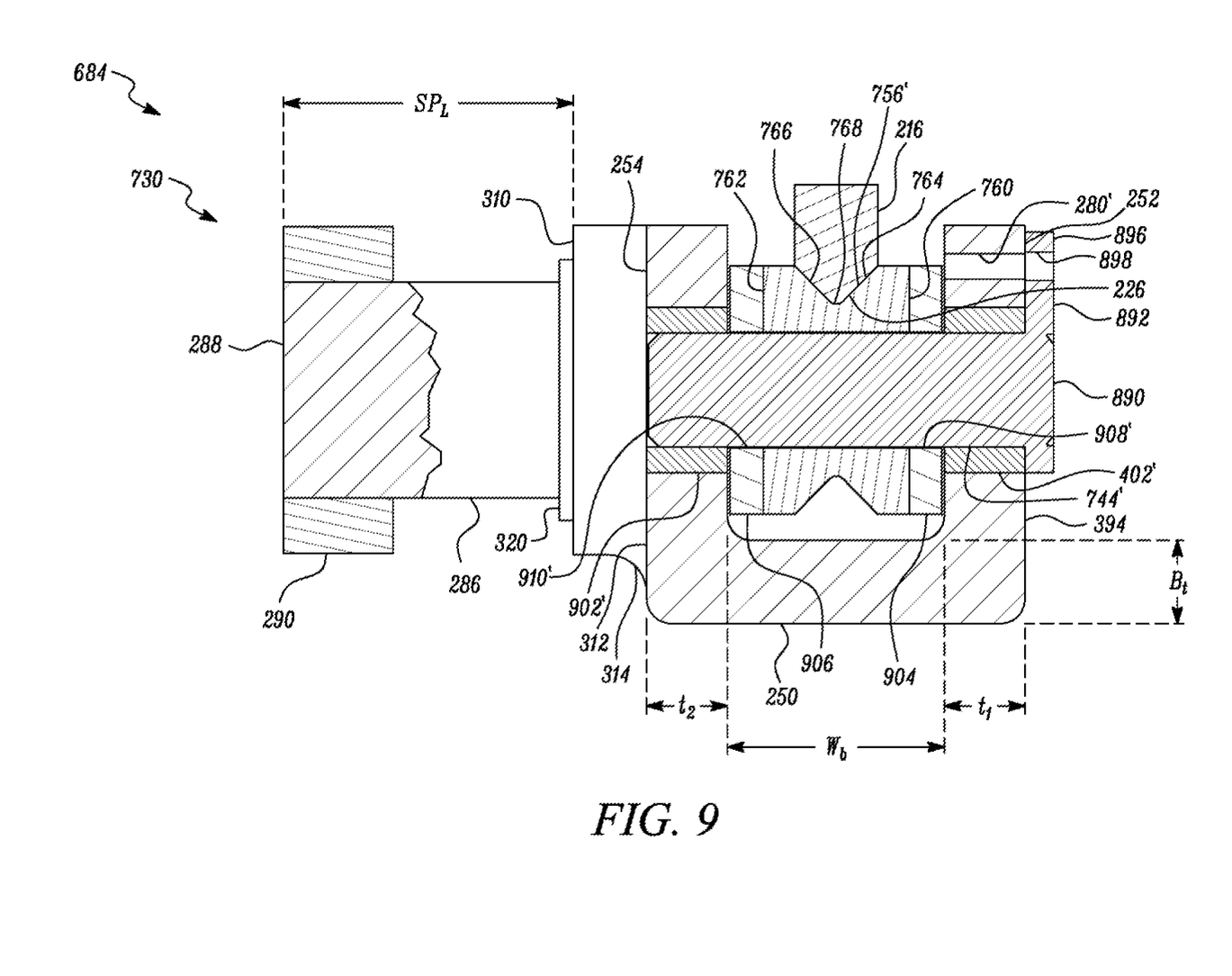
FIG. 9 is a side cross-sectional view of the bearing arrangement of FIG. 7.

Pins 744 of the lower retainer unit 730 will now be discussed. Pins 744 may be three in number (one corresponding to each roller bearing 750', 750", 750'''), in this embodiment. A higher or a lower number of roller bearings 750 and pins 744 may also be contemplated. For example, the lower retainer unit 730 includes a first pin 744', a second pin 744", and a third pin 744'''. The first pin 744' may be inserted through the first bore 260' and into the first through hole 752' of the first roller bearing 750', and further extended into the second bore 262' (of the second sidewall 254). Similarly, the second pin 744" may be inserted through the first bore 260" and into the second through hole 752" of the second roller bearing 750", and further extended into the second bore 262" (i.e. a blind bore in the second sidewall 254). Furthermore, the third pin 744''' may be inserted through the first bore 260''' and into the third through hole 752''' of the third roller bearing 750''', and further extended into the second bore 262''' (of the second sidewall 254). In that manner, the first roller bearing 750', second roller bearing 750", and the third roller bearing 750''', may be supported respectively by the first pin 744', second pin 744", and the third pin 744''', and may freely rotate relative to the first pin 744', second pin 744", and the third pin 744''', respectively about the first axis 274, the second axis 276, and the third axis 278.

Similar to the first pin 244' of the retention assembly 184, the first pin 744' of the retention assembly 684 includes a head portion 890 and a lobe portion 892 that projects outwardly from the head portion 890. Further, as with the lobe portion 392, the lobe portion 892 may rest on the outer surface 394 of the first sidewall 252 in an assembly of the first pin 744' to the first sidewall 252. Moreover, the lobe portion 892 also defines an apex 896, and a slot 898 (referred to as a first slot 898) formed at the apex 896. For assembling the first pin 744' through the first bore 260', and further into the first through hole 752' of the first roller bearing 750', the first slot 898 is co-axially positioned relative to the first aperture 280'. The first fastener 400' is inserted and passed through the first slot 898 and the first aperture 280' so as to secure the lobe portion 892, and thus the first pin 744' to the first sidewall 252. The first pin 744' thereby restricts a rotation of the first pin 744' relative to the first axis 274. A structure and arrangement of the second pin 744", by use of the second fastener 400", and the third pin 744'", by use of the third fastener 400'", relative to the first sidewall 252 is similar to that of the first pin 744' discussed above. Accordingly, annotations corresponding only to the first pin 744' have been provided for clarity and easy understanding.

While the first bearing 402' may be interposed between the first pin 744' and the first bore 260', and, similarly, the third bearing 402'" may be interposed between the third pin 744'" and the first bore 260'", a second bearing 402" may be interposed between the second pin 744" and the first bore 260". Further, since the first pin 744' (along with the second pin 744" and third pin 744'") may extend all the way into the corresponding second bores 262', 262", 262'", a fourth bearing 902', fifth bearing 902", and a sixth bearing 902'", may be included in the lower retainer unit 730 of the retention assembly 684. The fourth bearing 902' may be interposed between the first pin 744' and the second bore 262'; the fifth bearing 902" may be interposed between the second pin 744" and the second bore 262"; and the sixth bearing may be interposed between the third pin 744'" and the second bore 262'".

As shown in FIGS. 7, 8, and 9, the bearing arrangement 742 may further include a first wear insert 904 and second wear insert 906. The wear inserts 904, 906 may be thrust washers, and may be positioned between the roller bearings 750', 750", 750'" and the first sidewall 252 and the second sidewall 254, respectively. The first wear insert 904 may include openings 908', 908", 908'" that, in assembly with the first sidewall 252, are correspondingly co-axial with the first bores 260', 260", 260'". The second wear insert 906 may include similar openings, referred to as openings 910', 910", 910'" that, in assembly with the second sidewall 254, are correspondingly co-axial with the second bores 262', 262", 262'".

INDUSTRIAL APPLICABILITY

Referring to FIG. 2, the lower retainer unit 230 of the retention assembly 184 engages the first rail 216 from the bottom, while the upper retainer unit 232 of the retention assembly 184 engages the second rail 218 from the top. In one scenario, as the wear strip 332 of the lower retainer unit 230 may wear out, clearances may develop between the wear strip 332 and the first rail 216 or the second rail 218. As a result, the retainer units 230, 232 may be adjusted relative to the rails 216, 218. For example, an adjustment process may include a vertical movement of the lower retainer unit 230 towards the first rail 216 (see arrow, V. FIG. 2), by using any suitable mechanism. A similar adjustment of the upper retainer unit 232 may be contemplated, if required.

Referring to FIG. 6, the lower retainer unit 730 of the retention assembly 684 engages the first rail 216 from the bottom, while the upper retainer unit 732 of the retention assembly 684 engages the second rail 218 from the top. As clearances may develop between one or more roller bearings 750', 750", 750'" and the first rail 216 or the second rail 218, the retainer units 730, 732 may be adjusted relative to the rails 216, 218. For example, an adjustment process may include a vertical movement of the lower retainer unit 730 towards the first rail 216 (see arrow, Y, FIG. 6), by using any suitable mechanism. A similar adjustment of the upper retainer unit 732 may be contemplated, if required.

The yoke 240 provides for a modularity to change between either of the bearing arrangement 242 or the bearing arrangement 742 depending upon an area of machine application. Further, in several conventional practices, one or more end plates are usually coupled to retainer units. This is because as a blade may slide relative to the retainer units, the associated wear strips may move out of the retainer units along with a movement of the blade. End plates, coupled to retainer units, restrict such wear strip movements. However, end plates block a visual access to the wear strips, and if a wear strip needed inspection, in conventional practice, it is required for an operator to disassemble the end plates from the retainer units before viewing the wear strips. The use of pins 244, 744 according to the present disclosure, respectively retain the bearing arrangements 242, 742 within the cavity 256. As a result, end plates need not be employed in the retention assemblies 184, 684, thus allowing the bearing arrangements 242, 742 to be visually inspected without having to remove any component of the grader machine 100, thus saving cost, time, and effort.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A retention assembly to slidably retain a blade to a support bracket of a grader machine, the retention assembly comprising:
   a yoke adapted to be coupled to the support bracket, the yoke including:
      a base wall,
      a first sidewall extending directly from the base wall, the first sidewall being configured to face the blade and defining a first thickness, and one or more first bores extending through the first thickness, and
      a second sidewall extending directly from the base wall, the second sidewall configured to face away from the blade and spaced apart from the first sidewall to define a cavity therebetween, along with the base wall, the second sidewall defining a second thickness and including one or more second bores at least partly extending through the second thickness, the one or more second bores being correspondingly co-axial with the one or more first bores;
   a bearing arrangement received within the cavity and adapted to support the blade for sliding movement of the blade relative to the bearing arrangement; and
   one or more pins extending correspondingly through at least one of the one or more first bores or the one or more second bores of the yoke and into the cavity to engage and retain the bearing arrangement within the cavity.

2. The retention assembly of claim 1, the yoke further including a shaft portion extending outwardly from the second sidewall, the shaft portion adapted to pass through an opening of the support bracket for coupling the yoke to the support bracket, the shaft portion defining an end remote to the second sidewall.

3. The retention assembly of claim 2, wherein the one or more pins extend through only one of the one or more first bores or the one or more second bores of the yoke.

4. The retention assembly of claim 1, wherein the bearing arrangement includes:
   a block received within the cavity and including one or more recesses to correspondingly receive the one or more pins; and
   a wear strip engaged with the block and adapted to be interposed between the block and the blade to provide a support surface for the blade to slide relative to the wear strip, by way of a support of the moldboard resting on the support surface of the bearing arrangement, the wear strip having a V-shaped profile.

5. The retention assembly of claim 1, wherein the bearing arrangement includes:
   a roller bearing adapted to engage the blade, the roller bearing including a through hole defining an axis of rotation, the roller bearing receiving a corresponding pin of the one or more pins into the through hole,
   wherein the corresponding pin extends from either the one or more first bores or the one or more second bores and is received into the other of the one or more first bores or the one or more second bores.

6. The retention assembly of claim 5 further including a first wear insert positioned between the roller bearing and the first sidewall, and a second wear insert positioned between the roller bearing and the second sidewall.

7. The retention assembly of claim 5, the roller bearing including a first frusto-conical portion and a second frusto-conical portion, the first frusto-conical portion and the second frusto-conical portion being separated by a central roller portion narrower in diameter than the first frusto-conical portion and the second frusto-conical portion.

8. The retention assembly of claim 1, the first sidewall further defining an aperture associated with each first bore of the one or more first bores.

9. The retention assembly of claim 8, wherein each pin of the one or more pins, extending into a corresponding first bore, includes a head portion and a lobe portion projecting outwardly from the head portion, the lobe portion including a slot, the retention assembly further including a fastener passing through the slot and a corresponding aperture associated with the corresponding first bore.

10. A blade assembly for a grader machine, the blade assembly comprising:
    a blade adapted to engage a work surface;
    a support bracket adapted to be coupled to a pair of arms extending from a circle member of the grader machine;
    a yoke coupled to the support bracket, and slidably engaged with the blade, the yoke including:
      a base wall,
      a first sidewall extending directly from the base wall and facing the blade and defining a first thickness, and one or more first bores extending through the first thickness, and
      a second sidewall extending directly from the base wall and facing away from the blade and spaced apart from the first sidewall to define a cavity therebetween, along with the base wall, the second sidewall defining a second thickness and including one or more second bores at least partly extending through the second thickness, the one or more second bores being correspondingly co-axial with the one or more first bores;
    a bearing arrangement received within the cavity and adapted to support the blade for sliding movement of the blade relative to the bearing arrangement; and
    one or more pins extending correspondingly through at least one of the one or more first bores or the one or more second bores of the yoke and into the cavity to engage and retain the bearing arrangement within the cavity,
    wherein the one or more pins are removable from the yoke and the bearing arrangement without decoupling the yoke from the support bracket.

11. The blade assembly of claim 10, the support bracket including an opening, the yoke further including a shaft portion extending perpendicularly outwardly from the second sidewall, the shaft portion passing through said opening and defining an end remote to the second sidewall, the blade assembly further including a collar coupled to the end to secure the yoke to the support bracket.

12. The blade assembly of claim 10, wherein the bearing arrangement includes:
    a block received within the cavity and including one or more recesses to correspondingly receive the one or more pins; and
    a wear strip engaged with the block and adapted to be interposed between the block and the blade to provide a surface for the blade to slide relative to the wear strip, the wear strip having a V-shaped profile.

13. The blade assembly of claim 10, wherein the bearing arrangement includes:
    a roller bearing adapted to engage the blade, the roller bearing including a through hole defining an axis of rotation, the roller bearing receiving a corresponding pin of the one or more pins into the through hole,
    wherein the corresponding pin extends from either the one or more first bores or the one or more second bores and is received into the other of the one or more first bores or the one or more second bores.

14. The blade assembly of claim 13, the roller bearing including a first frusto-conical portion and a second frusto-conical portion, the first frusto-conical portion and the second frusto-conical portion being separated by a central roller portion narrower in diameter than the first frusto-conical portion and the second frusto-conical portion.

15. The blade assembly of claim 10, the first sidewall further defining an aperture associated with each first bore of the one or more first bores.

16. The blade assembly of claim 15, wherein each pin of the one or more pins, extending into a corresponding first bore, includes a head portion and a lobe portion projecting outwardly from the head portion, the lobe portion including a slot, the blade assembly further including a fastener passing through the slot and a corresponding aperture associated with the corresponding first bore.

17. A grader machine, comprising:
    a circle member;
    a pair of arms extending from the circle member;
    a support bracket movably coupled to the pair of arms extending from the circle member;
    a moldboard adapted to engage a work surface;
    a yoke coupled to the support bracket, and slidably engaged with the moldboard, the yoke including:
      a base wall,
      a first sidewall extending directly from the base wall and facing the moldboard and defining a first thickness, and one or more first bores extending through the first thickness, and a second sidewall extending directly from the base wall and facing away from the moldboard and spaced apart from the first sidewall to define a cavity therebetween, along with the base wall, the second sidewall defining a second thickness and including one or more second bores at least partly extending through the second thickness, the one or more second bores being correspondingly co-axial with the one or more first bores;

a bearing arrangement received within the cavity and adapted to support the moldboard for sliding movement of the moldboard relative to the bearing arrangement; and one or more pins extending correspondingly through at least one of the one or more first bores or the one or more second bores of the yoke and into the cavity to engage and retain the bearing arrangement within the cavity, wherein the one or more pins are removable from the yoke and the bearing arrangement such that all of the bearing arrangement remains within the cavity but is removable from the cavity.

18. The grader machine of claim 17, the support bracket including an opening, the yoke further including a shaft portion extending perpendicularly outwardly from the second sidewall, the shaft portion passing through said opening and defining an end remote to the second sidewall, the grader machine further including a collar coupled to the end to secure the yoke to the support bracket.

19. The grader machine of claim 17, wherein the bearing arrangement includes:
   a block received within the cavity and including one or more recesses to correspondingly receive the one or more pins; and
   a wear strip engaged with the block and adapted to be interposed between the block and the moldboard to provide a surface for the moldboard to slide relative to the wear strip, the wear strip having a V-shaped profile.

20. The grader machine of claim 17, wherein the bearing arrangement includes:
   a roller bearing adapted to engage the moldboard, the roller bearing including a through hole defining an axis of rotation, the roller bearing receiving a corresponding pin of the one or more pins into the through hole,
   wherein the corresponding pin extends from either the one or more first bores or the one or more second bores and is received into the other of the one or more first bores or the one or more second bores.

\* \* \* \* \*